M. WALKER.
COMMUTATING DEVICE FOR DYNAMO ELECTRIC MACHINES.
APPLICATION FILED NOV. 30, 1910.

1,158,598.

Patented Nov. 2, 1915.
2 SHEETS—SHEET 1.

WITNESSES:
C. L. Belcher
Otto J. Schairer

INVENTOR
Miles Walker
BY
Wiley E. Carr
ATTORNEY

M. WALKER.
COMMUTATING DEVICE FOR DYNAMO ELECTRIC MACHINES.
APPLICATION FILED NOV. 30, 1910.

1,158,598.

Patented Nov. 2, 1915.
2 SHEETS—SHEET 2.

WITNESSES:
C. L. Belcher
Otto S. Schairer

INVENTOR
Miles Walker
BY
ATTORNEY

UNITED STATES PATENT OFFICE.

MILES WALKER, OF HALE, ENGLAND, ASSIGNOR TO WESTINGHOUSE ELECTRIC AND MANUFACTURING COMPANY, A CORPORATION OF PENNSYLVANIA.

COMMUTATING DEVICE FOR DYNAMO-ELECTRIC MACHINES.

1,158,598.  Specification of Letters Patent.  Patented Nov. 2, 1915.

Application filed November 30, 1910. Serial No. 594,992.

*To all whom it may concern:*

Be it known that I, MILES WALKER, a subject of the King of Great Britain, and a resident of Hale, in the county of Chester, England, have invented a new and useful Improvement in Commutating Devices for Dynamo-Electric Machines, of which the following is a specification.

My invention relates to dynamo electric machines of the commutator type, such, for instance, as direct current generators and rotary converters, and it has for its object to provide machines of this character with improved arrangements whereby, among other advantages, satisfactory commutation of the armature current may be effected throughout a wide range of load.

In dynamo electric machines of the kind to which the invention relates, it has previously been proposed to obtain the necessary commutating electromotive force by placing auxiliary field poles between the main poles and providing them with exciting windings to be traversed by the armature current. These auxiliary poles, hereinafter referred to as commutating poles, serve to impress a commutating electromotive force upon the short circuited portions of the armature windings lying under the commutator brushes which is proportional to the armature current.

According to the present invention, the winding of a commutating pole of this kind is provided with a considerably greater number of turns than would ordinarily be employed and is connected between two commutator brushes of the same polarity, forming parts of a subdivided current-collecting device, which is connected to the external circuit of the machine.

Figure 1:
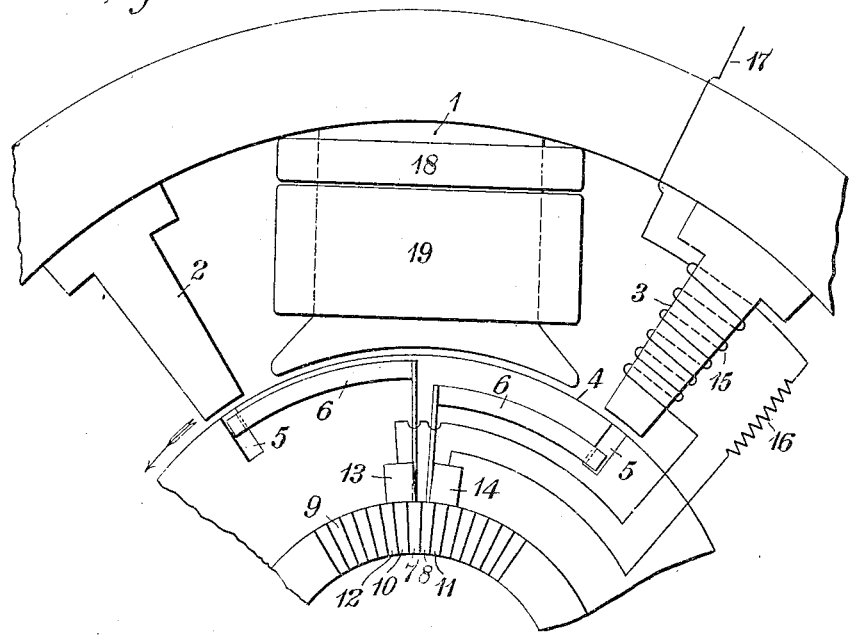
Figure 2:
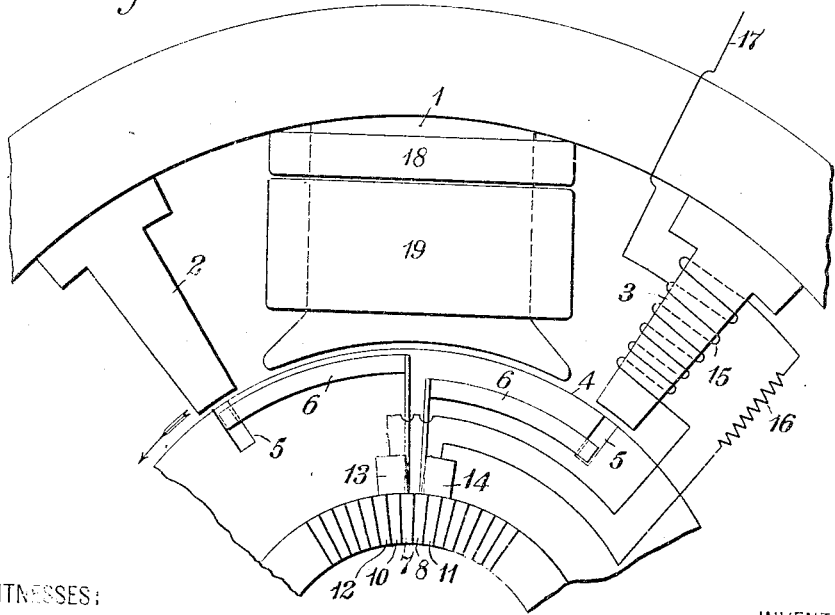
Figure 3:
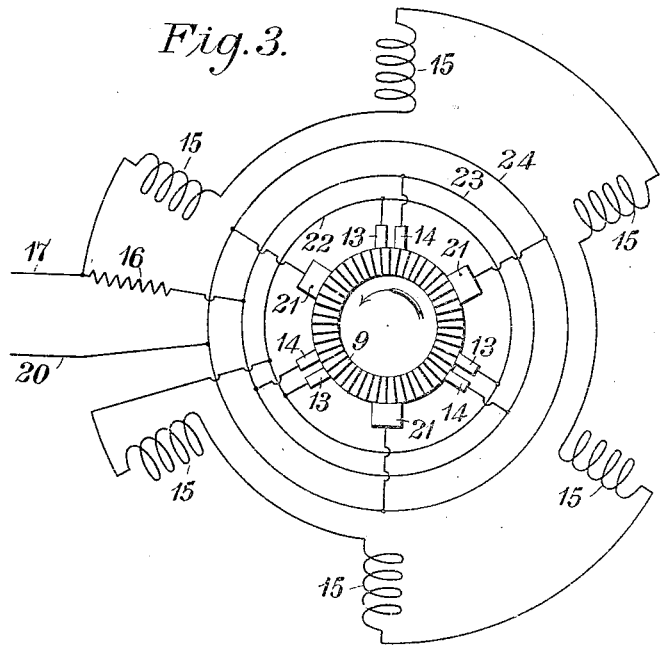
Figure 4:
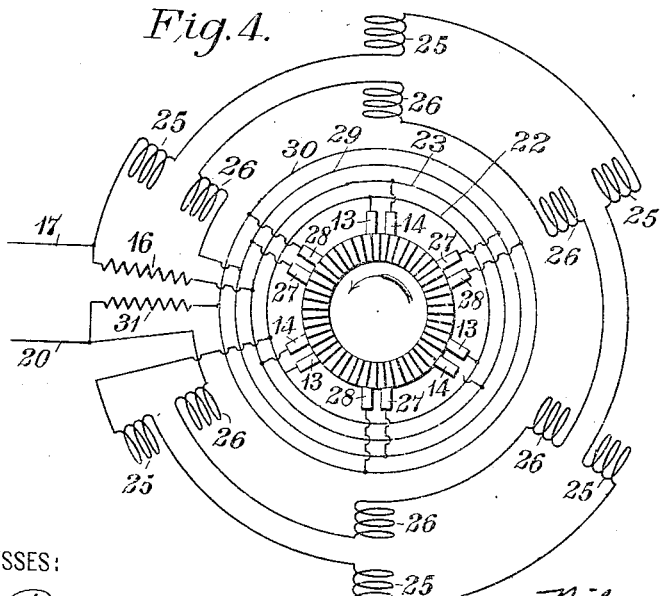

In the accompanying drawings, Figure 1 is a diagrammatic view, in end elevation, of a portion of a dynamo electric machine embodying my invention. Fig. 2 is a view similar to Fig. 1 but illustrating a modification of the manner of connecting the commutator brushes of the machine to the external circuit. Figs. 3 and 4 are diagrammatic views illustrating various systems of connecting the exciting windings of the commutating poles and the commutator brushes to the external circuit, in a machine embodying my invention.

Referring now to Fig. 1, the portion of the dynamo electric machine illustrated comprises a main pole 1 and commutating poles 2, 3. The armature of the machine is indicated at 4 as provided with the usual slots 5 for the reception of the armature winding, a single coil of which is indicated at 6 as having its terminals connected to two segments 7, 8 of the commutator cylinder 9. Other commutator cylinder segments are indicated at 10, 11 and 12 and will be hereinafter referred to, in explaining the operation of the machine. A single collecting device is shown in the figure as comprising two distinct portions or brushes 13, 14 which are located close together. The direction of rotation of the armature is indicated by the arrow and the forward brush 13 is connected, in series with the exciting winding 15 of the commutating pole 3, to the conductor 17 leading to the external circuit, to which the machine is connected, the backward brush 14 being connected, in series with a resistance 16, to one end of the exciting winding 15, as shown in the figure. The main pole 1 of the machine is provided with the usual series field winding 18 and shunt field winding 19.

The operation of the machine will be readily understood from the following explanation:—Assuming that the composite current-collecting device 13, 14 is positive and is situated in the true neutral axis of commutation for no load on the machine, the said axis would, if it were not for the action of the commutating pole, be shifted forward in the direction of rotation, as the load on the machine increases, with the result that the potential at the commutator segments 7, 10 and 12 would be higher than the potential at the commutator segments 8 and 11. There is thus a tendency for a greater portion of the current collected from the armature winding to traverse the brush 13 than the brush 14, the self-induction of the coil 6, which is, for the moment, under commutation, serving to assist this tendency. As is well known, the provision of the commutating pole 3 will tend to make the potential at the commutator segments 8 and 11 greater than the potential at the commutator segments 7, 10 and 12, this action serving to cause a reversal in the direction of the current traversing the coil 6, which is under commutation, so as to prevent sparking when the commutator segment 12 leaves the brush 13. The flux through the commutating pole, hereinafter referred to as the commutating flux, must, in machines as usually constructed, vary in strict accordance with the load, in order to secure satisfactory commutation.

In a machine constructed according to the present invention, an adjustment of the commutating flux is automatically obtained by the action of the brushes 13, 14 and the exciting winding 15 of the commutating pole above described.

The number of turns of the exciting winding 15 is so selected that, when the said winding is traversed by one half of the current traversing the composite collecting device 13, 14, the magneto-motive force due to the corresponding ampere turns will cause such a flux through the commutating pole 3 that satisfactory commutation is effected, the self-induction of the coil 6, under commutation, being neutralized so as to obtain an equal division of the current between the brushes 13, 14. These conditions being obtained for any one load, the apparatus will be found to be automatically self-adjusted throughout a wide range of load, since, if the commutating pole is too strong, it increases the current collected by the brush 14, whereas, if the said pole is too weak, the current collected by the brush 13 is increased. If, for instance, the load on the machine increases to such an extent that the iron on the commutating pole 3 begins to be magnetically saturated and therefore to require an increase in the current traversing its exciting winding which is proportionately greater than the increase in the load, the current traversing the brush 13 will be increased. The current traversing the exciting winding 15, which is connected to the said brush 13, will therefore be more than one-half of the total current collected from the composite collecting device and the commutating pole will be excited to an extent which is proportionately greater than the increase in the load, so that the conditions of good commutation are automatically restored.

If the load on the machine increases so suddenly that the commutating pole 3 cannot respond to the increased exciting current, there is a tendency to impose the whole current upon the brush 13 and, when this occurs, all the current will traverse the exciting winding 15 and the magneto-motive force on the commutating pole 3, which is caused thereby, will then be twice as great as is usually the case in commutating pole machines of ordinary type. The above mentioned condition represents the upper limit of the range of automatic adjustment of the commutation of the machine and the latter will only fail to commutate satisfactorily when the load is such as to require more than double the number of turns on the commutating pole.

As will be readily understood, the present invention avoids the necessity for very exact adjustment of the ampere turns on the commutating pole in order to insure satisfactory commutation, since, if the said ampere turns are not of the proper value for good commutation at any load, the commutating flux will cause the proportion of the current traversing the several parts of the composite collecting device to be altered in such a way as to increase or decrease the current traversing the exciting winding of the commutating pole and thereby adjust the flux thereof to the proper value.

The resistance 16, above referred to, may be approximately equal to the resistance of the exciting coil 15 of the commutating pole 3, or, in some cases, the said resistance may be made considerably smaller than that of the coil 15, or even omitted altogether, and, in such cases, it is preferable to slightly reduce the number of turns in the exciting coil 15 by such an amount that the electromotive force at the commutator segments 7, 10 and 12 under the brush 13 is sufficiently greater than the electromotive force at the commutator segments under the brush 14 to overcome the drop in voltage through the exciting coil 15.

Referring now to Fig. 2 a modification of the arrangement of Fig. 1 is shown in which the conductor 17 is connected to an intermediate point in the winding 15, the effect of such connection being to insert a corresponding resistance in the circuit leading from the brush 14 and, at the same time, since the current traversing the said brush passes through a portion of the exciting winding 15 in a reverse direction to that of the current traversing the brush 13, an excessive current traversing the brush 14 will have the effect of de-magnetizing, or even reversing, the polarity of the commutating pole 3.

The portions of the machine illustrated in Figs. 1 and 2 show only a single positive current-collecting device. The negative current-collecting devices are not shown in these figures, but may be subdivided in a similar manner to the collecting device 13, 14 or each of these may consist of a simple brush. In the latter case, the distribution of the current over the contact surface of the brush will be rendered sufficiently uniform by the action of the positive brushes which automatically maintain the commutating flux at the proper value. An arrangement of the positive and negative current-collecting devices in this way is illustrated diagrammatically in Fig. 3, in which the composite positive collecting devices are indicated at 13, 14 and the simple negative brushes at 21. As will be seen from the figure, all the forward brushes 13 are connected to a common conductor 22, which is connected, through the exciting coils 15 of all the commutating poles, in series with one another, to one terminal 17 of the external circuit of the machine. All the backward brushes 14 are similarly connected to a common conductor 23 which is connected through a resistance 16 to the terminal 17. The negative brushes 21 are all connected together to the opposite terminal 20. The connection system shown in Fig. 3 may evidently be modified by connecting the exciting windings 15 of the commutating poles in parallel with one another instead of in series, as shown in Fig. 3, in which case the connection of each exciting winding 15 to its corresponding brushes 13, 14 may be separate and distinct from the connections of the remaining commutating poles and brushes, as shown in Figs. 1 and 2.

It will be obvious that, in the connection system of Fig. 3, the brushes 13, 14 may be the negative current-collecting device and the simple brushes 21 the positive collecting devices provided that the connections of the exciting windings 15 are so arranged that the proper polarity is given to the commutating poles. It is also possible to employ both positive and negative subdivided current-collecting devices, such an arrangement being shown in Fig. 4. Each of the exciting windings of the commutating poles is in this case divided into two parts 25 and 26. The conductors 22 and 23 connected to the positive brushes 13, 14 are in this case connected to the terminal 17 in series with the exciting windings 25 and the resistance 16, respectively. The subdivided negative brushes 27 and 28 are similarly connected to common conductors 29 and 30, respectively, the conductors 29 and 30 being connected to the other terminal 20 in series with the exciting windings 26 and a resistance 31, respectively. Other systems of series or parallel connection of the exciting windings of the commutating poles may obviously be employed.

From the foregoing description it will be readily understood that a more or less uniform distribution of the current through the different parts of the collecting devices or brushes is obtained by the use of the invention and it is therefore possible to use brushes of considerably greater width than those ordinarily employed, thereby effecting a reduction in the size of the commutator required for a given current.

I claim as my invention:

1. In a dynamo-electric machine wherein the commutating axis shifts with changes of load, the combination with a commutating pole exciting winding divided into two unequal parts, of a main current brush divided into two circumferentially separated parts, connections whereby the brush part in the direction of heavy load shift of the commutating axis supplies current to an external circuit through the major portion of said exciting winding, and connections whereby the brush part in the direction of light load shift supplies current to said external load circuit through the minor portion of said exciting winding, the magnetic fields thus produced in the two portions of the exciting winding opposing each other.

2. A dynamo electric machine having commutating poles provided with exciting windings connected in the external circuit and commutator brushes severally divided into a plurality of parts that are insulated from one another, the said parts being connected to different points in the commutating pole windings, whereby the relation between the currents traversing the several parts of such collecting devices is controlled by causing any excessive current traversing one of the said parts to vary the excitation of the corresponding commutating pole and thereby change the flux of the said pole to restore the normal current relation between the said parts, substantially as described.

3. A dynamo electric machine of the commutator type comprising a field magnet having main and commutating poles provided with exciting windings, and two adjacent main brush parts of the same polarity that are insulated from each other and are connected to the external circuit through unequal portions of the exciting windings of the commutating poles, for the purpose specified.

4. A dynamo-electric machine of the commutator type comprising main and commutating field magnet poles, commutating field windings on the said commutating poles, a resistor, and two adjacent main brush parts of the same polarity that are insulated from each other and are respectively connected to the external circuit through the said commutating windings, and through the said resistor, whereby the currents traversing the two brush parts produce opposing magnetizations, substantially as and for the purpose specified.

5. A dynamo-electric machine of the commutator type comprising a two-part main commutator brush, a commutating pole provided with a winding having a considerably larger number of turns than would normally be required to commutate the full-load current of the machine, connections from the two parts of the said commutator brush to different points on the said winding, and a lead adapted to connect the said winding to an external electric circuit.

6. A dynamo electric machine of the commutator type having commutating poles provided with exciting windings, a plurality of main brushes that are severally divided into two parts for connection to different parts of the exciting windings of the commutating poles of the machine, and a connection from still another part of the exciting winding to
5 an external circuit, substantially as described.

In testimony whereof, I have hereunto subscribed my name this tenth day of November 1910.

MILES WALKER.

Witnesses:
F. W. LE FALL,
A. S. CACHEMAILLE.